June 22, 1948.  S. EVANS  2,443,900
WHEEL MOUNTING
Filed March 22, 1944  3 Sheets-Sheet 1

Inventor
Sanford Evans.
By Rosenblatt & Bartholow
Attorneys

June 22, 1948.  S. EVANS  2,443,900
WHEEL MOUNTING
Filed March 22, 1944  3 Sheets-Sheet 2

Inventor
Sanford Evans
By Rockwell & Bartholow
Attorneys

June 22, 1948.  S. EVANS  2,443,900
WHEEL MOUNTING

Filed March 22, 1944  3 Sheets-Sheet 3

Inventor
Sanford Evans
By Rockwell Bartholow
Attorneys

Patented June 22, 1948

2,443,900

UNITED STATES PATENT OFFICE 2,443,900

WHEEL MOUNTING

Sanford Evans, Westport, Conn., assignor to The Bassick Company, Bridgeport, Conn., a corporation of Connecticut Application March 22, 1944, Serial No. 527,559

14 Claims. (Cl. 305—1)

This invention relates to wheel mountings and, more particularly, to those of that type in which the wheel revolves about a skein eccentrically mounted with respect to the axle, there being a spiral spring connecting the skein with the axle supporting member and holding the wheel normally in a predetermined angular position with respect to said member. The wheel may be used for supporting the body of a land vehicle, and the cushioned wheel mounting which is provided permits the vehicle to progress more smoothly and easily over obstacles or uneven ground.

The present invention relates to certain structural features of wheel mountings of this type, and the particular mounting disclosed is intended for embodiment in the mountings of bogie wheels in track laying vehicles. However, the invention is not limited to this particular application or use.

One of the objects of the invention is to provide an improved means of connection between the spiral spring and the skein, which will facilitate production of the parts and the assembly thereof.

Another object is to provide improved means facilitating the assemblage of the wheel mounting and permitting the proper adjustment of the bearings between the wheel body and the skein.

To these and other ends, the invention consists in the novel features and combinations of parts to be hereinafter described and finally pointed out in the claims.

Figure 4:
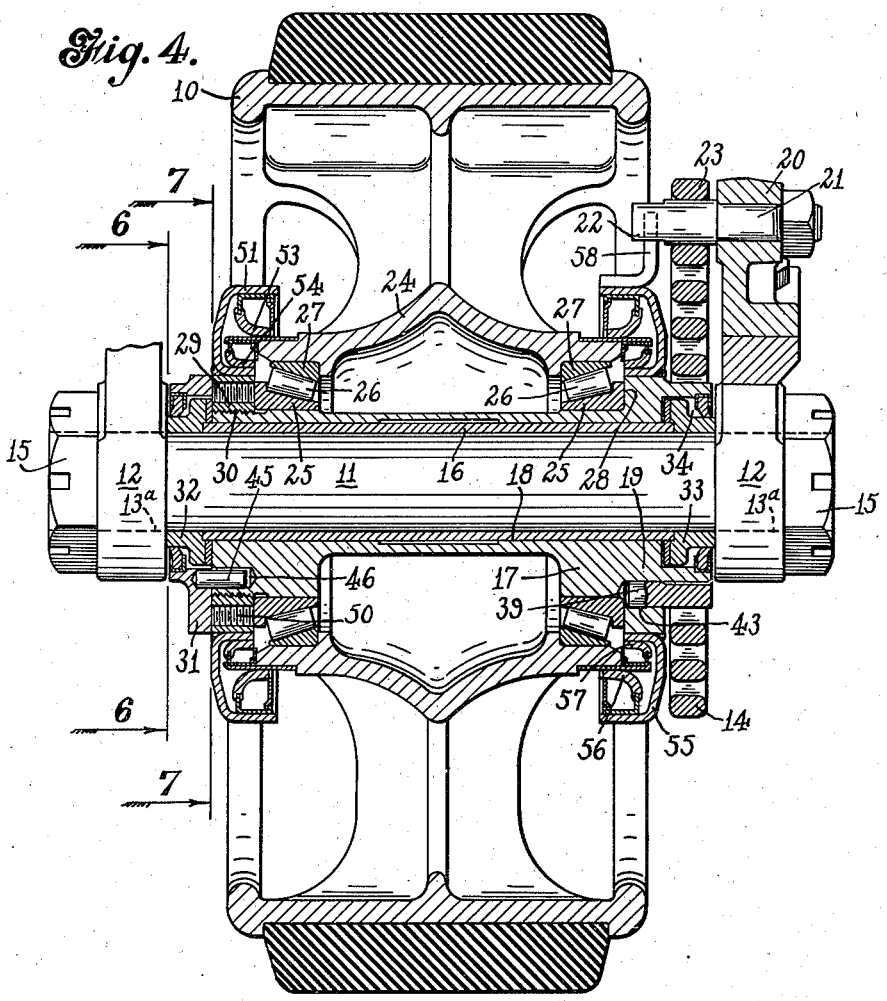
Fig. 4 is a section on line 4—4 of Fig. 3.
Figure 6:
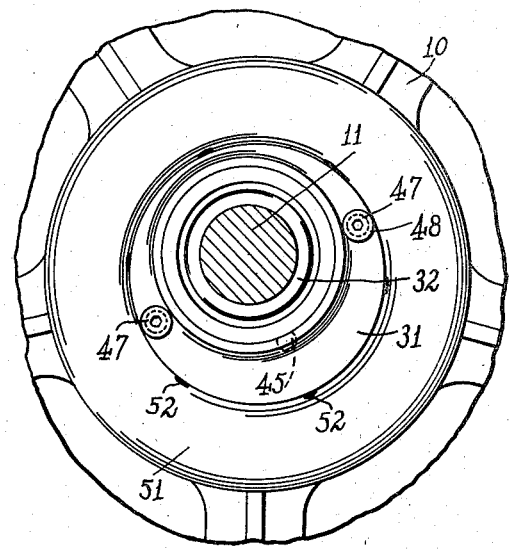
Figure 7:
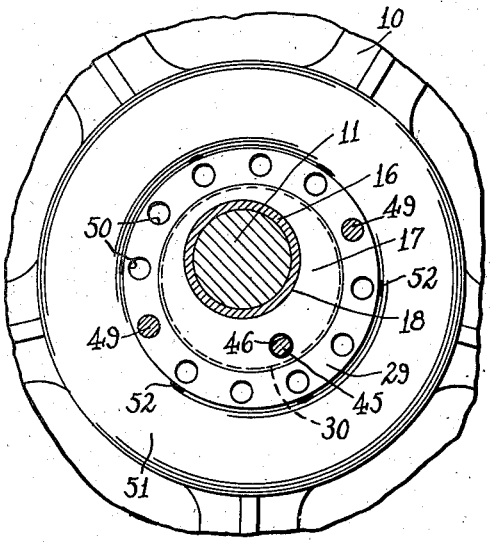
Figure 8:
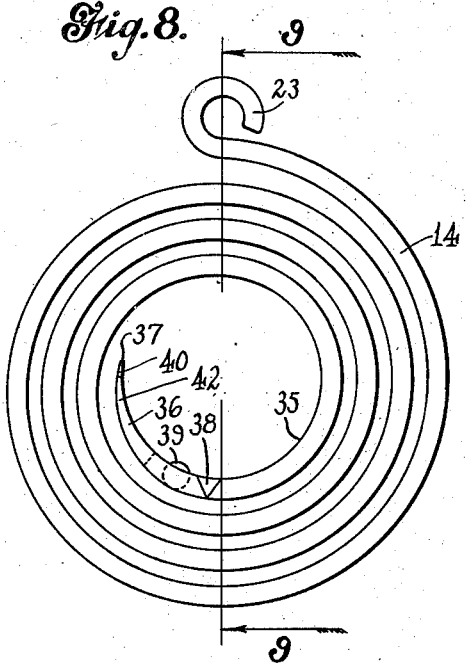
Figure 9:
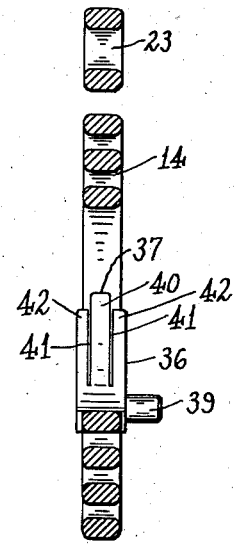

Fig. 6 and Fig. 7 are sections taken on lines 6—6 and 7—7, respectively, of Fig. 4; and Fig. 8 and Fig. 9 are detail views of the pancake spiral spring, Fig. 9 being a section on line 9—9 of Fig. 8.

In the drawings, the wheel mounting is shown in connection with a wheel carried by a pair of supporting arms such as customarily employed in mounting the bogie wheels of track laying vehicles. The wheel is indicated at 10 and the same has an axle 11 extending between and secured in place in the free ends 12 of parallel supporting arms 13. For mounting the wheel on the arms 13 in such a manner that it can have a controlled cushioned movement relatively to the arms, a torsion joint is employed between the wheel and the arms, and, in association with this joint, which is of the construction hereinafter described, there is a pancake spiral spring 14 located at one side of the wheel in the space between the wheel and the adjacent supporting arm.

The wheel axle 11 is in the nature of a pin extending between the arms 13 and engaged at its end portions in perforations 13ª in said arms and fastened in place by suitable means such as nuts 15. Surrounding the axle or pin 11 in the space between the arms is a sleeve 16, and, surrounding this sleeve, is a skein 17 on which the wheel 10 is revolubly mounted. The skein 17 has a through longitudinal bore 18 which is located eccentrically with respect to the skein. At one end, the skein has an axial extension or portion 19 which extends beyond the adjacent side or face of the wheel and is adapted to be connected to the inner end of the spring 14 in the manner hereinafter described. The spring 14 is a pancake spiral spring made of suitable metal such as steel, and its inner end is connected to the skein portion 19, while its outer extremity is secured to one of the supporting arms 13. In the form shown, one of the arms 13 has applied to it, in a suitable manner as by welding, a lug or bracket 20 through which passes a bolt 21, and the bolt 21 is connected to the outer end of the spring in a suitable manner as by having the extremity of the spring formed into an eye 23 within which the bolt engages. At the inner end of bolt 21 is a stop extension 22, the function of which will be explained later on.

The wheel 10 is provided with a hub 24 revolubly mounted on skein 17 by means of suitable bearings, and, in the case shown, roller bearings are interposed between the skein and the wheel at the respective sides of the wheel hub, each of these bearings having an inner race 25, tapered anti-friction rollers 26, and an outer race 27. It will be noted that the skein portion 19 provides a shoulder 28 against which one of the races 25 is positioned. At the other side of the wheel, the corresponding race 25 is held in place by a nut 29 in the form of a ring having interior threads in engagement with threads 30 on the extremity of the skein. Over nut 29, and between the same and the adjacent arm 13, is a cap member 31 having an eccentric opening or aperture, in which opening or aperture is located a thrust collar 32 surrounding the axle between the end of the sleeve 16 and the adjacent supporting arm. At the opposite side of the wheel, a similar thrust collar 33 is interposed between the supporting arm and the end of the sleeve 16, this thrust collar being received within an end recess 34 with which the portion 19 of the skein is provided.

Figure 1:
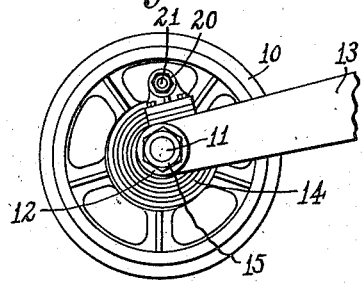
Fig. 1 is a side elevation of a wheel mounting embodying my improvements, the same being applicable for example to a bogie wheel used in a track laying vehicle.
Figure 2:
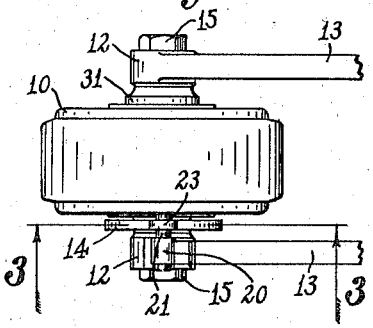
Fig. 2 is a top plan view of the parts shown in Fig. 1.
Figure 3:
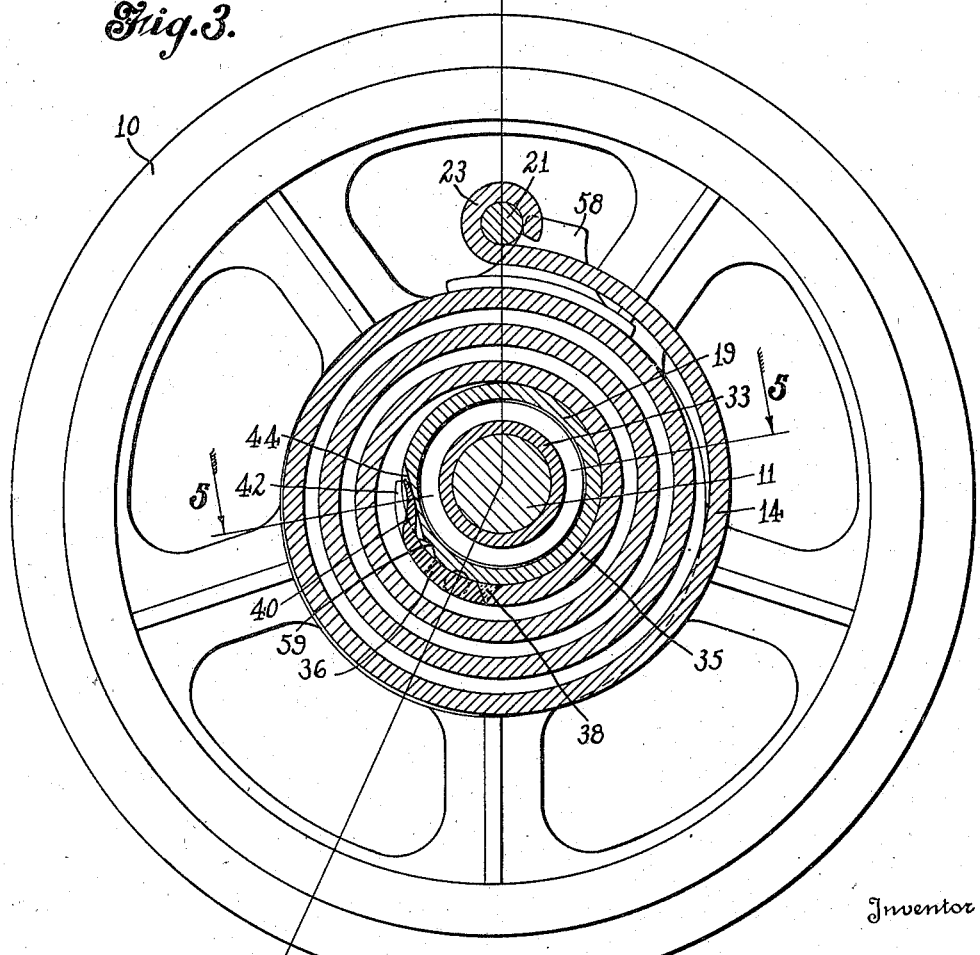
Fig. 3 is an enlarged section on line 3—3 of Fig. 2.

The spiral spring 14 is shown in detail in Figs. 8 and 9, and it will be noted that, in the portion adjacent its inner extremity, it is shaped to conform, over a considerable area, to the peripheral cylindrical surface with which the skein portion 19 is provided. In the case shown, this cylindrical peripheral portion, provided upon the skein for the purpose of engaging and supporting the spring, is concentric with the axle 11. Fig. 3 shows how, in the normal position of the wheel, relatively to its supporting arms, the innermost turn of the spring conforms to the skein over a considerable area, this being indicated at 35. It will be observed, furthermore, that the inner end portion of the spring is progressively decreased in thickness through a substantial portion of the innermost turn, so as to provide a tapered portion 36, terminating in a thin tip 37. The portion 36, which is tapered in this manner, may initially be formed as a separate piece applied to the inner extremity of a spring body by a weld which is indicated in the drawing at 38, this being a very convenient way of providing a spring of the required form. The portion 36 is provided with an integral pin 39, projecting from one side thereof, said pin being preferably located at what may be termed the butt of the tapered part 36, the pin 39 being a part of the means for fastening the spring to the skein as hereinafter described. Furthermore, the tapered or tip portion 36 is provided, adjacent its free end, with a tongue portion 40 provided by furnishing the free end with parallel slits or kerfs 41. The tongue 40, as shown in Fig. 9, is initially of somewhat greater length than the portions 42 which are separated therefrom by the slits 41.

Figure 5:
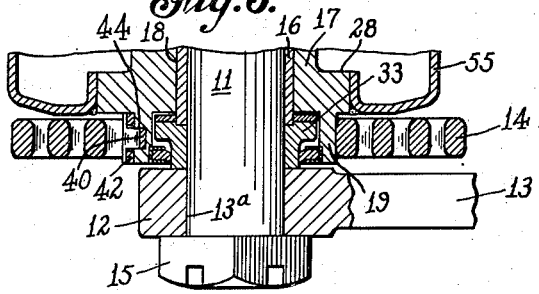
Fig. 5 is a section on line 5—5 of Fig. 3.

The pin or projection 39 carried by the spring is disposed parallel to the axis of the spring and is adapted to be received in a correspondingly shaped socket 43 formed in the end face of the portion 19 of the skein. The spring is adapted to be assembled by moving it into place over that part of the skein projecting from the face of the wheel, the inner end of the pin 39 being engaged with the mouth of the socket 43 and the pin entering the socket as the spring is moved to the assembled position shown in Fig. 4. The pin 39 serves as a means for anchoring the spring very effectively in relation to the skein so that there can be no relative turning movement between those parts. When the spring is placed in position, the tongue 40 lies in substantially the same plane as the portions 42, but, after the spring has been moved to the assembled position, the tongue is deformed in order to interlock it with the skein, so that there will be no relative axial movement. As will be seen from Figs. 3 and 5, the peripheral portion of the skein is provided with a transverse groove or kerf 44 extending in a tangential direction, and, by the use of a suitable tool, the tongue 40 is bent down so as to interlock with the grooved portion of the skein in the manner shown. The portions 42 have their inner faces in contact with the surfaces of the skein adjacent the sides of the groove 44.

At the opposite side of the wheel, the end cap 31, previously mentioned, is adapted to be locked to the adjacent end of the skein in a suitable manner as by providing a pin 45 which projects from the inner face of the cap and is adapted to be received in a correspondingly shaped socket 46 formed in the end of the skein. The end cap 31 is a member of the same general character as the skein in that it has an eccentrically located opening therein, and the cap is always placed on the skein in the same position angularly with respect to the skein, this being the position in which the pin 45 rigid with the cap will engage the opening 46 provided for the reception of the pin.

The cap 31 is only located angularly by the pin 45, and it is held against axial displacement by being fastened to the nut 29. For this purpose, two screws 47 are employed, these screws preferably being diametrically located with respect to the cap, as shown in Fig. 6. These screws have cylindrical knurled heads 48 with wrench receiving sockets in the heads, and threaded shanks 49 (Fig. 7) which engage sockets with which the nut 29 is provided. In order to provide for a nice adjustment of the nut 29 on the skein so as to permit an optimum adjustment of the roller bearings between the wheel and the skein, the nut is provided with a number of threaded sockets 50 in the peripheral portion thereof, these sockets being spaced apart at relatively small distances. Thus, after precise adjustment of the nut, the two screws 47 associated with the cap 31 may be screwed into two diametrically located sockets 50 of the nut which are adjacent the screws.

It will also be noted that nut or ring 29 has associated therewith a flanged sheet metal ring 51 having inner and outer flanges that are directed toward the body of the wheel. This ring may be connected to the nut 29 in a suitable manner as by welding it thereto at a number of points, these welds being indicated in the drawings at 52. The welds may be conveniently located in an angle between the outer side wall of the nut and the adjacent surface of the sheet metal ring. Within the collar 51 are carried annular sealing devices 53 and 54 which prevent the entrance of dust or dirt into the adjacent roller bearing. At the opposite side of the wheel, a similar sheet metal ring 55 is welded to the skein portion 19, and this ring is provided interiorly with annular sealing devices 56 and 57 that prevent ingress of dust and dirt into the adjacent roller bearing. The ring 55 may also serve as a mounting for a stop lug 58 that is welded thereto, which projects from the ring in a radial direction so as to cooperate with the previously mentioned stop extension 22 on the bolt 21. In the normal position of the wheel, as shown in Fig. 3, the stop lug 58 is in contact with one side of the stop extension 22.

It will be seen that by this invention a superior form of connection is provided between the inner end of the spring and the skein. This connection is very strong, the spring being held effectively against dislocation from the skein, either in an angular direction or in an axial direction. Moreover, the construction is very simple, and, as above described, the assembly of the spring with the skein is an easy, quick operation. On the other hand, should it be necessary to remove the spring from the skein, a tool can be introduced under the inner extremity of the spring in a manner to pry outward the tongue 40, and the spring can then be easily removed from the skein in an axial direction, the anchoring pin on the spring pulling out of its axial socket. In Fig. 3 there is shown at 59 a recess formed in the skein into which such a tool can be inserted, said recess having an entrance at the end face of the skein. By providing the features described, the production of the device can be carried out more speedily. It will also be apparent that the described construction permits assemblage of the parts with the anti-friction bearings in an adjustment in which the wheel will rotate smoothly without lost motion.

A further feature of the structure is that the terminal portion of the spring at which anchoring is effected provides on the innermost turn of the spring a spiral outer surface of such shape as to permit conformation thereto of the next turn of the spring, as the spring is wound or tightened.

In referring to a "pancake spiral" spring it is intended to indicate that the spring lies in substantially a single plane, as distinct from a volute spring, which is extended in the direction of the axis of the coil.

While only one embodiment of the invention is shown in the drawings, it will be understood that the invention can be embodied in many other forms and that various changes in the details can be made without departing from the principles of the invention or the scope of the claims.

What I claim is:

1. In a wheel mounting, an axle, means for providing a fixed axle support, a skein mounted for turning on an axis eccentric to the skein, a wheel revolubly mounted on the skein, and a spiral spring having an inner end and an outer end and connected at the outer end to the axle support, the inner end of said spring being anchored to the skein by a projection from the side face of the spring entering a correspondingly formed socket in the end face of the skein.

2. In a wheel mounting, an axle, means for providing a fixed axle support, a skein mounted for turning on an axis eccentric to the skein, a wheel revolubly mounted on the skein, and a spiral spring having an inner end and an outer end and connected at the outer end to the axle support, the inner end of said spring being anchored to the skein by a projection from the side face of the spring entering a correspondingly formed socket in the end face of the skein, the inner extremity of the spring conforming to the periphery of the skein and the spring being gradually tapered at said extremity.

3. The combination of a member having a substantially cylindrical peripheral surface, a pancake spiral spring having an inner end conforming to said surface and tapering toward said inner end, and means for holding the spring to said member so that displacement in either an angular or axial direction is prevented, said means including a projection extending from the side of the spring into a socket in the end face of said member.

4. The combination of a member having a substantially cylindrical peripheral surface, a pancake spiral spring having an inner end conforming to said surface and tapering toward said inner end, and means for holding the spring to said member so that displacement in either an angular or axial direction is prevented, said means including a projection extending from the side of the spring into a socket in the end face of said member and also including a tongue, formed on the spring at its inner extremity and engaging a transverse groove formed in said member at its periphery.

5. The combination of a member having an axial end extension with a transverse depression in its periphery in the form of a groove, and a spiral spring having its inner end in embracing relation to said member and provided with a depressed terminal tongue engaging said groove.

6. The combination of a member having an axial end extension with a transverse groove in its periphery, and a spiral spring having its inner end in embracing relation to said member and provided with a depressed tongue engaging said groove, said tongue being provided between longitudinal slits formed in the spring at its inner extremity.

7. The combination with a member having an axial extension with a transverse groove in its periphery, of a pancake spiral spring having a part at its inner end engaged in said groove, said spring carrying a pin projecting from one side thereof which enters a socket in the end face of said member.

8. In a wheel mounting of the type involving an axle, means providing a fixed axle support, a skein mounted for turning on the axle on an axis eccentric to the skein, anti-friction bearings embracing the skein and arranged respectively at opposite sides of the median plane of the wheel, a wheel revolubly mounted on said anti-friction bearings, and resilient means normally holding the skein in a predetermined angular position relatively to the axle, the combination of a nut screwing on the skein adapted at one side of the wheel to adjust said anti-friction bearings, an end cap at the same side of the wheel as the nut, means locating said end cap in a predetermined angular position relatively to the skein, said nut having a circumferential series of threaded sockets placed close together and arranged in pairs so that the sockets of a pair are diametrically disposed, and fastening screws for the end cap in a predetermined diametrical location in the end cap and adapted to engage diametrically opposite sockets of said nut.

9. In a wheel mounting of the type employing a turning wheel supporting skein and a spiral spring controlling its position, the combination of a skein having a substantially cylindrical peripheral surface, a pancake spiral spring having an inner end conforming to said surface and tapering toward said inner end, and means for holding the spring to the skein so that displacement in either an angular or axial direction is prevented, said last named means including a part on the spring engaging the end face of the skein for preventing angular displacement and a part engaging the periphery of the skein for preventing axial displacement.

10. In a wheel mounting of the type employing a turning wheel supporting skein and a spiral spring controlling its position, the combination of a skein having a substantially cylindrical peripheral surface, a pancake spiral spring having an inner end conforming to said surface and tapering toward said inner end, and means for holding the spring to the skein so that displacement in either an angular or axial direction is prevented, said last named means including a part on the spring engaging the end face of the skein for preventing angular displacement and a part engaging the periphery of the skein for preventing axial displacement, the portion of the spring carrying said parts being formed as a separate portion welded to the spring body.

11. In a wheel mounting, an axle, means providing a fixed axle support, a skein mounted for turning on the axle on an axis eccentric to the skein, and a pancake spiral spring normally holding the skein in a predetermined angular relation to the axle connected at the outer end to the axle support and having an innermost turn conforming to the outer surface of the skein through a considerable portion of the skein circumference, a part only of said turn being tapered to provide a tapered inner extremity, said inner extremity being fixed to the skein by being interlocked therewith.

12. The combination of a member having a cylindrical peripheral surface and an adjacent lateral face, and a spiral spring having its inner end portion in embracing relation to said member over a portion of said surface and in opposition to said lateral face, said spring being interlocked with said member at the terminal portion of the spring to prevent axial or angular displacement.

13. The combination of a member having a cylindrical peripheral surface and an adjacent lateral face, a spiral spring having its inner end portion in embracing relation to said member over a portion of said surface and in opposition to said lateral face, said spring being interlocked with said member at the terminal portion of the spring to prevent axial or angular displacement, and the inner end portion of the spring being reduced in thickness so as to be tapered in the terminal portion of the innermost turn.

14. In a wheel mounting, the combination of a skein having adjacent one extremity a cylindrical peripheral surface and having short of the extremity a shoulder presenting a lateral face disposed toward the extremity, a pancake spiral spring having its inner end portion in embracing and conforming relation to said cylindrical surface and having its inner end portion reduced in thickness toward the end so as to be tapered, the inner face of the taper being engaged with said cylindrical surface, said spring having short of the inner extremity a lateral projection entering a socket in said lateral face, and the spring being interlocked with the skein in a location between said projection and the inner extremity.

SANFORD EVANS.

REFERENCES CITED

The following references are of record in the file of this patent:

UNITED STATES PATENTS

| Number | Name | Date |
|---|---|---|
| 187,424 | Slicer | Feb. 13, 1877 |
| 684,997 | Matheson | Oct. 22, 1901 |
| 1,403,039 | Kolling | Jan. 10, 1922 |

FOREIGN PATENTS

| Number | Country | Date |
|---|---|---|
| 31,055 | France | Aug. 17, 1926 |